Aug. 22, 1933.  E. B. LUITWIELER  1,923,989
PIPING AND THE LIKE
Filed June 4, 1932
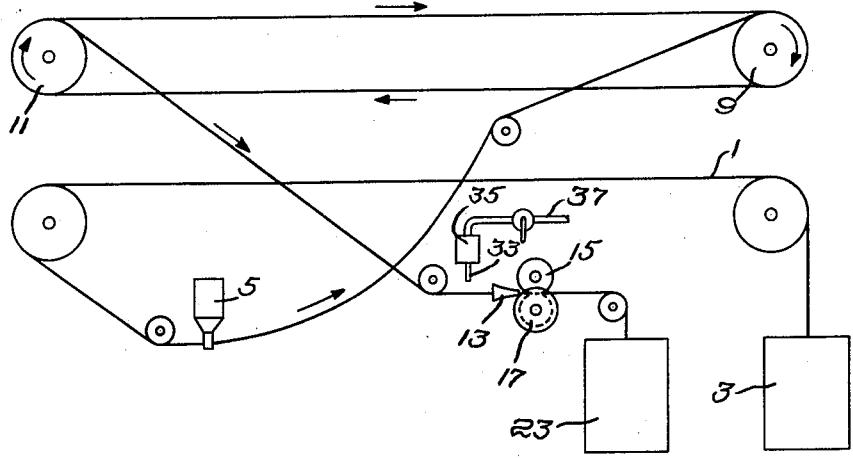
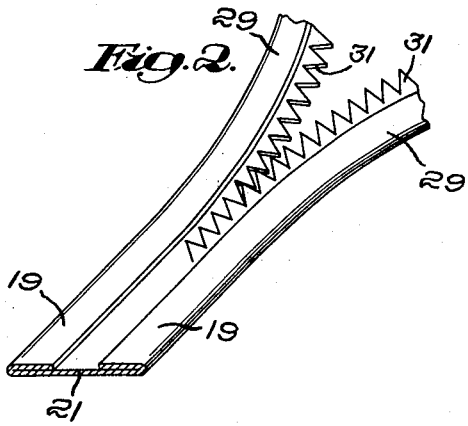
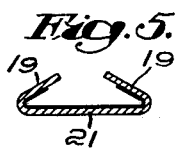
Inventor:
Edward B. Luitwieler,
by Emery, Booth, Varney and Townsend
Attys Patented Aug. 22, 1933

1,923,989

UNITED STATES PATENT OFFICE 1,923,989

PIPING AND THE LIKE

Edward B. Luitwieler, Malden, Mass.

Application June 4, 1932. Serial No. 615,394

9 Claims. (Cl. 36—57)

My invention relates to piping and similar material commonly employed for purposes of ornamentation, for example, ornamenting the edges of the uppers of shoes at the shoe opening.

From certain aspects the invention constitutes an improvement on the piping and method of making the same disclosed in applicant's Patent 1,843,087, issued January 26, 1932. The invention however will be best understood from the following description when read in the light of the accompanying drawing, while the scope of the invention will be more particularly pointed out in the appended claims.

In the drawing:—

Fig. 1 is a schematic representation of one form of apparatus employed for the practice of the method of making piping according to the invention;

Fig. 2 is a perspective view of the strip on an enlarged scale, with the adhesive coating omitted for convenience of illustration, indicating subsequent operations performed thereon after being operated upon by the apparatus according to Fig. 1; and Figs. 3 to 7 are cross-sections of the strip on an enlarged scale illustrating the various steps of applying the adhesive and folding the strip.

According to the method of making piping described in applicant's hereinbefore mentioned patent, the folds are secured to the body of the strip by use of a water insoluble cement, such as rubber cement, which also acts to size the strip, after which water soluble cementitious material, such as glue, is applied. The use of rubber cement is objectionable in that rubber has a relatively short life, resulting in the folds opening up when the piping ages. Also the rubber cement is rather costly and is of such nature that it does not form a perfect surface for the adhesive glue employed for securing the piping to the shoe upper; and further, when the rubber ages, it causes the adhesive glue to be ineffective for securing the piping. According to the present invention, the folds are secured to the body of the strip by the same adhesive which is employed for securing the piping to the shoe upper or other article to be finished, this glue preferably being so compounded as to render sizing unnecessary, thus avoiding the use of rubber cement and eliminating the disadvantages incident to its use.

Preferably the cementitious material employed is so compounded as to be quick jellying, so as to avoid material penetration of the piping, which if it did penetrate the material to any material extent would tend in many instances to render the piping stiff. Also the cementitious material is so compounded that when in sheet form, and dry, or, as it is called in the art, "hard", it is pliable or flaccid in the sense that it can be bent or crumpled without fracture similarly to cloth or thin leather, resulting in the production of a piping in which is preserved the original character in this respect of the leather or other material of which the piping is made; still further, this cementitious material is so compounded as to be non-tacky when dry or "hard", allowing the final product to be readily handled and wrapped in coils without the use of a shield. Still further, this cementitious material preferably is so compounded that only a slight amount of water applied to its surface will render it extremely adhesive, thus eliminating the necessity of applying so much water as to cause opening up of the folds. To the end of facilitating the application of the piping, and insuring that the cementitious material will be non-tacky when the sewing operation is performed, the adhesive is so compounded that it forms a quick drying adhesive when slightly moistened with water, and upon drying retains all its original properties.

As an example of a suitable cementitious coating material, but without limitation thereto, that employed preferably is an animal glue such as bone or hide glue, a satisfactory composition consisting of by weight 50 parts hide glue with 75 parts water, or a mixture of these two glues with an appropriate change in the amount of water to secure the same fluidity. For rendering the glue flaccid, 10 to 40% by weight of glycerin or zinc oxide which act as plasticizers may be added to the solution. Preferably, however, 20% zinc oxide and 10% glycerin are employed as giving most satisfactory results. This glue, besides being flaccid and non-tacky when "hard", and capable of forming an adhesive without penetrating the body of the piping when slightly moistened with water, also has the property when applied hot of jellying quickly so as to prevent it from penetrating the body of the piping. Conveniently the flaccidity of the coating is controlled by varying the amount of zinc oxide, and the quick jellying property controlled by varying the amount of glycerin, although each of these substances acts to make the material flaccid.

In producing the piping, a strip 1 of natural or artificial leather of cross-section illustrated by Fig. 3 may be fed from the can 3 over suitable rollers to a glue spreading device 5, which latter places a layer 7 of the glue upon the upper side of the strip, as illustrated in Fig. 4, this layer preferably not extending to the edges of the strip so as not to interfere with the subsequent operation of the folding device. The glue compounded as above described is preferably applied at a temperature of from 115 to 130° F., resulting in the glue quickly jellying as it cools.

The strip is guided from the glue spreader over the rolls 9 and 11 in several passes so as to permit the cementitious coating to cool and partially harden, whereupon it is passed through the folding device 13 which bends it to the shape illustrated by Fig. 5. It then passes between the upper and lower presser rolls 15 and 17 which firmly press the folded portions 19 against the body 21 of the strip and give the strip the cross-sectional shape illustrated by Fig. 6. The strip may then be collected by feeding it into the can 23.

After the above operations are performed, the strip may again be passed through a glue spreading device, and a second coating of the same cementitious material applied, with the result that the exterior surfaces of the folds 19 are covered with coatings 25, while the surface of the strip between the two folded portions is coated with a coating 27 of double the thickness of the coatings 25, which makes the coated side of the sheet approximately uniform. Preferably, the coatings 25 extend to approximately, but not quite, the edge of the strip, so as to insure that the coating material will not inadvertently be applied to the opposite side of the strip in case no glue is desired at that side. This precaution, however, may be immaterial in cases where it is desired to apply a coating to both sides of the strip.

The coating on the strip is now allowed to harden, and the strip is passed through a splitting machine so as to form two lengths of piping 29. Preferably the splitting is formed along a serrated line so as to form serrations 31 at the edge of the piping opposite the folds, or otherwise the split portion of the piping so that the same may be freely bent laterally. The pliable, non-tacky nature of the adhesive coating readily permits this splitting of the strip without the adhesive flaking from the sharp corners of the serrations or gumming the splitting roll.

In some instances it may be desirable to permit the coating of glue applied by the spreader 5 to harden completely before performing the folding operation. In such cases the strip may be made adhesive by subjecting its coated side to the action of a mist-like spray of water, preferably hot water or steam. To this end the strip may be passed beneath a spray nozzle 33 provided with a heating device 35 which converts water supplied the nozzle by way of the pipe 37 to steam.

It will be understood that wide deviations may be made from the forms of the invention herein described without departing from the spirit thereof.

I claim:

1. Piping and the like comprising a strip of leather or like flexible material one edge portion of which is folded over and secured to the body of said strip by a layer of cementitious material which extends substantially to the opposite edge thereof in contacting non-penetrating relation to said strip, said layer being of sufficient flaccidity to preserve substantially the original property in this respect of said strip and to permit extreme bending of the piping without material flaking or fracture, and being non-tacky when dry and being of such thickness and property as to be capable of forming a quick drying adhesive without softening of the material under the fold when the exposed surface of the layer is slightly moistened with water, and upon drying being again non-tacky and flaccid.

2. Piping and the like comprising a strip of leather or like flexible material one edge portion of which is folded over and secured to the body of said strip by a layer of cementitious material which extends materially beyond said folded portion, said layer being flaccid and non-tacky and being of such thickness and property as to be capable of forming a quick drying adhesive without softening of the material under the fold when the exposed surface of the layer is slightly moistened with water.

3. Piping and the like comprising a strip of leather or like flexible material one edge portion of which is folded over and secured to the body of said strip by a layer of cementitious material which directly contacts with said strip in substantially non-penetrating relation thereto and extends materially beyond said folded portion, said layer being flaccid and non-tacky and being of such thickness and property as to be capable of forming a quick drying adhesive without softening of the material under the fold when the exposed surface of the layer is slightly moistened with water.

4. Piping and the like comprising a strip of leather or like flexible material one edge portion of which is folded over and secured to the body of said strip by a layer of cementitious material and the other edge portion of which is so formed as to render said strip freely bendable laterally, said layer directly contacting with the surface of said strip in substantially non-penetrating relation thereto and extending substantially to the opposite edge thereof and being flaccid and non-tacky and being of such thickness and property as to be capable of forming a quick drying adhesive without softening of the material under the fold when the exposed surface of the layer is slightly moistened with water.

5. Piping and the like comprising a strip of leather or like flexible material one edge portion of which is folded over and secured to the body of said strip by a layer of cementitious material which extends materially beyond said folded portion, said layer directly contacting with the surface of said strip in substantially non-penetrating relation thereto and being flaccid and non-tacky and being of such thickness and property as to be capable of forming a quick drying adhesive without softening of the material under the fold when the exposed surface of the layer is slightly moistened with water, and a layer of like cementitious material on the exterior surface of said folded edge portion.

6. Piping and the like comprising a strip of leather or like flexible material one edge portion of which is folded over and secured to the body of said strip by a layer of cementitious material which extends substantially to the opposite edge thereof and the other edge portion of which is so formed as to render said strip freely bendable laterally, said layer directly contacting with the surface of said strip in substantially non-penetrating relation thereto and being flaccid and non-tacky and being of such thickness and property as to be capable of forming a quick drying adhesive without softening of the material under the fold when the exposed surface of the layer is slightly moistened with water, and a layer of like cementitious material on the exterior surface of said folded edge portions.

7. Piping and the like comprising a strip of leather or like flexible material one edge portion of which is folded over and secured to the body of said strip by a layer of cementitious material which extends materially beyond said folded portion, said layer being flaccid and non-tacky and being of such thickness and property as to be capable of forming a quick drying adhesive when the exposed surface of the layer is slightly moistened with water and having a thickened portion on the exposed surface of said strip at the edge of said fold.

8. Piping and the like comprising a strip of leather or like flexible material one edge portion of which is folded over and cemented to the body of said strip by cementitious material which extends under the fold and constitutes a relatively thick layer on the body of said strip between said folded edge portion and the opposite edge of said strip, a relatively thinner layer of like cementitious material on the exterior surface of said folded edge portion, said layers of cementitious material being flaccid and non-tacky when dry and being of such thickness and property as to be capable of forming a quick drying adhesive without softening of the material under the fold when the exposed surfaces of said layers are slightly moistened with water.

9. Piping and the like comprising a strip of leather or like flexible material one edge portion of which is folded over and cemented to the body of said strip by cementitious material which extends under the fold and constitutes a relatively thick layer on the body of said strip between said folded edge portion and the opposite edge of said strip, a relatively thinner layer of like cementitious material on the exterior surface of said folded edge portion, the other edge portion of said strip being so formed as to render said strip freely bendable laterally, said layers of cementitious material directly contacting with the surface of said strip in substantially non-penetrating relation thereto and being flaccid and non-tacky when dry and being of such thickness and property as to be capable of forming a quick drying adhesive without softening of the material under the fold when the exposed surfaces of said layers are slightly moistened with water.

EDWARD B. LUITWIELER.